Jan. 14, 1930.  E. LUDLOW  1,743,365
AUTOMOBILE HEATER REGISTER
Filed June 8, 1928
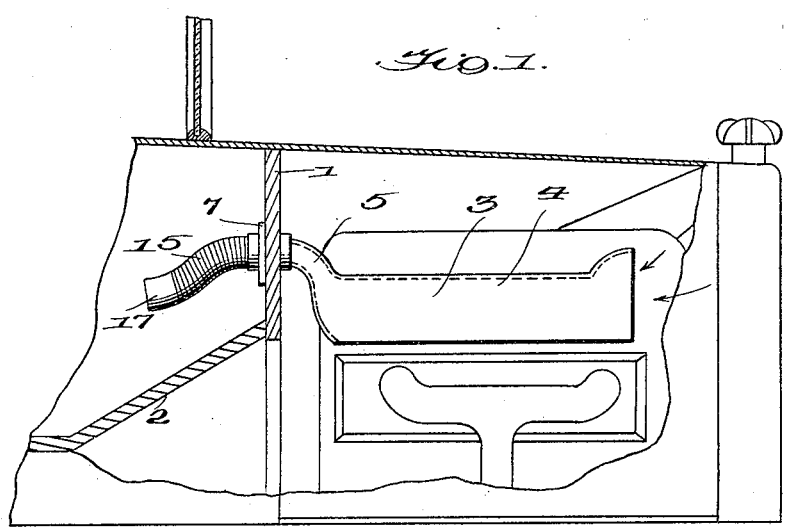
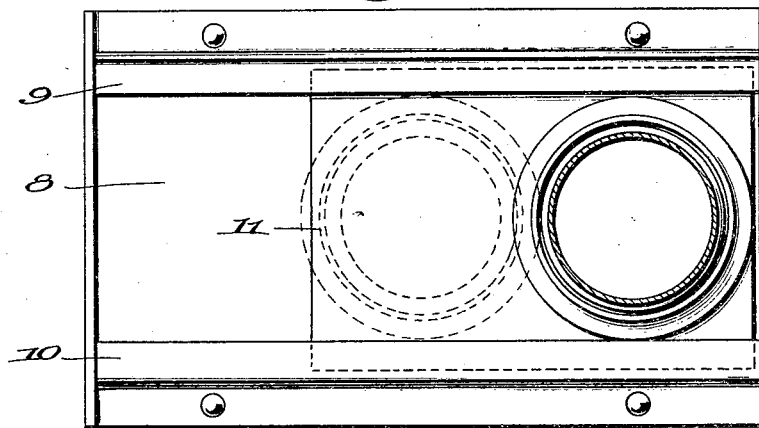
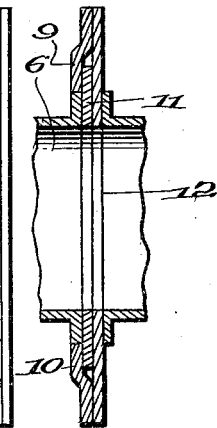
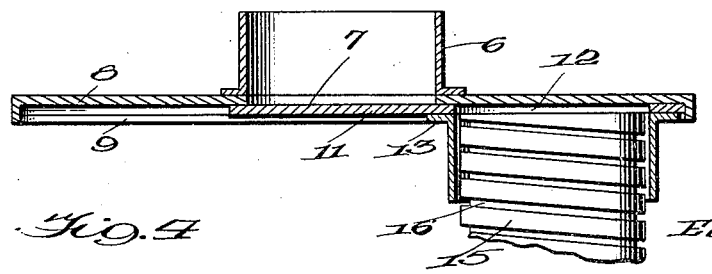
Inventor
EDMUND LUDLOW,
By A. P. Greely
Attorney Patented Jan. 14, 1930

1,743,365

UNITED STATES PATENT OFFICE

EDMUND LUDLOW, OF INDIANAPOLIS, INDIANA

AUTOMOBILE HEATER REGISTER

Application filed June 8, 1928. Serial No. 283,925.

My invention relates to automobile heaters that is, devices intended to make use of the heat of the engine casing for the purpose of warming the interior of the automobile for the comfort of the driver or passengers, and my invention has for its object to provide a simple and inexpensive device readily secured in place by which the heat supplied from the engine may be readily regulated or cut off as desired. My invention belongs to the type of automobile heaters disclosed in the patent to Brickey, No. 1,209,386, dated Dec. 19, 1916, in which a current of air heated by the engine is admitted through the dashboard to be distributed as may be found desirable for the comfort of persons sitting in the automobile.

With the object above indicated, and other objects hereinafter explained in view my invention consists in the construction and combination of elements hereinafter described and claimed.

Referring to the drawings:

Figure 1 is a side view partly in section of the engine and forward portion of an automobile having the device of my invention applied thereto.

Figure 2 is a face view of the device of my invention.

Figure 3 is a vertical central sectional view of the same, and

Figure 4 is a horizontal sectional view on line 4—4 of Figure 2.

In the drawings 1 indicates the dashboard of an automobile; 2 indicates the footboard below the dashboard; 3 indicates the engine and 4 indicates a casing enclosing the exhaust manifold or other portion of the engine which in operation is highly heated, this casing being open at its forward end for admission of air and being connected at its other end by pipe 5 to the dashboard. The construction shown and above described is that shown and described in the patent to Brickey, No. 1,209,386, above referred to and forming no part of my present invention.

Delivery pipe 5 at its rear end is secured to a flanged tubular ring 6 which is secured to the dashboard 1 about an opening 7 in a plate 8 which is secured to the rear face of dashboard 1. This plate 8 extends a substantial distance, at least a distance equal to the diameter of the opening 7, to right and left of this opening and is provided near its upper and lower edges with ways 9 and 10 adapted to receive between them a slide 11 and to permit this slide to be moved to right and left or from side to side in these ways, the ways being preferably so constructed that there will be sufficient frictional engagement of the slide to retain it in any position unless forcibly moved.

Slide 11 has in its right hand portion an opening 12 corresponding in diameter to opening 7 in plate 8 and about this opening is secured the flange 13 of a tubular ring adapted to receive the forward end of a flexible tube 15. This flexible tube 15 may be of any desired length but is preferably a short tube as shown having a ferrule 17 at its free end and may carry within it a coiled wire 16.

In use, plate 8 carrying slide 11 is secured to the rear face of the dashboard over an opening in the dashboard of sufficient size to permit tubular ring 6 to pass through it and pipe 5 leading from the casing 4 is connected to tubular ring 6. By moving the slide from the position in which it is shown in Figures 2 and 4 to the left opening 12 will be brought in register with opening 7 to a greater or less extent as may be desired and heated air will be admitted from casing 4 to tube 15 to be delivered in any direction to which the free end of this tube may be directed. And, of course, any movement of the slide towards the position in which it is shown in Figures 2 and 4 will gradually cut off the flow of heated air. The movement of the slide may be readily effected by the foot of the driver.

Having thus described my invention what I claim is:

In an automobile heating device the combination with means for conducting a current of heated air from about the engine to the dashboard, of means for controlling and distributing the current of heated air comprising a plate adapted to be secured to the dashboard having an opening therein for the current of heated air and a slide movable longitudinally on said plate having a portion thereof adapted to close the opening in said plate and an opening therein adapted to be moved into and out of register with the opening in the plate, and a tube connected with the opening in the plate for distributing the current of heated air.

In testimony whereof, I hereunto affix my signature.

EDMUND LUDLOW.